United States Patent [19]

Kuhnert

[11] 4,050,354
[45] Sept. 27, 1977

[54] MACHINE TOOL EQUIPPED WITH A MAGAZINE

[75] Inventor: Hans Kuhnert, Munich, Germany

[73] Assignee: Friedrich Deckel Aktiengesellschaft, Munich, Germany

[21] Appl. No.: 511,686

[22] Filed: Oct. 3, 1974

[30] Foreign Application Priority Data

Nov. 13, 1973 Germany ............................ 2356612

[51] Int. Cl.² .......................... B23C 1/04; B23C 1/16
[52] U.S. Cl. .................................... 90/13 C; 90/13.2; 408/3; 408/35
[58] Field of Search ................... 408/3, 35; 90/13 R, 90/13.1, 13.2, 13 C

[56] References Cited

U.S. PATENT DOCUMENTS

| 453,487 | 6/1891 | King .................................. 90/13.2 |
| 3,593,615 | 7/1971 | Shelton ........................... 90/13.2 X |
| 3,803,680 | 4/1974 | Kuhnert .......................... 408/35 X |
| Re. 25,670 | 10/1964 | Hansen et al. .................... 408/35 X |

Primary Examiner—Othell M. Simpson
Assistant Examiner—Z. R. Bilinsky
Attorney, Agent, or Firm—Blanchard, Flynn, Thiel, Boutell & Tanis

[57] ABSTRACT

A machine tool equipped with a magazine and a guide drum which is disposed alongside the magazine. A tracer is mounted on the guide drum and is movable in a three coordinate system and the magazine contains tools which are also movable in a three coordinate system and in a direct ratio to the movement of the tracer. The tracer, which is attached to the guide drum, follows the profile or contour of a master or pattern and the compound motion is transmitted to the magazine containing the tools. Therefore, the tools are moved in the same way as the tracer so that the master or pattern is thus reproduced.

9 Claims, 4 Drawing Figures

MACHINE TOOL EQUIPPED WITH A MAGAZINE

FIELD OF THE INVENTION

The invention relates to a machine tool comprising at least one tool magazine which is rotatable about a horizontal axis and traversible in the longitudinal direction of the machine, and one or more separately drivable tool spindles disposed parallel to the axis of the magazine.

BACKGROUND OF THE INVENTION

Machine tools of this kind in which the tools remain mounted in the magazine while being ready for use and while in actual use, have the advantage that tool changing equipment is not needed. A machine tool has already been proposed in which the magazine is capable of performing both rotary motions for transferring a selected tool into working position, and axial motions for feeding the tool (German Auslegeschrift No. 1 302 431). The motions in the longitudinal axis of the machine and particularly vertical motions which always involve considerable structural complications must then be associated with the workholder.

Another machine tool is already known in which vertical adjustment of a tool is effected by rotary motion of the magazine (German Offenlegungsshrift No. 2 038 842). This machine tool is designed for conventional machine jobs, particularly for drilling or milling. Several like rotary tool magazines may be disposed side-by-side and in this way the machine operations can be duplicated.

It is now the object of the present invention to provide a machine tool of the first herein specified kind which while involving little production expense is suitable for performing copy milling tasks. According to the invention, this is achieved by a guide drum or the like disposed alongside the magazine or magazines and endowed with the same degrees of freedom as the magazines with which it is adapted to be coupled in all directions of motion, besides carrying a tracer for tracing the profile or contour of a master or pattern. The tracer, attached to the guide drum, follows the profile or contour of a master or pattern and the compound motion consisting of translatory and rotary components is transmitted to the magazines containing the tools. These tools, therefore, move in the same way as the tracer so that the master or pattern is thus reproduced.

A structurally simple arrangement is one in which, according to the invention, the magazine and the guide drum are both mounted on a common slide which is traversible in the longitudinal direction of the machine.

The guide drum and the magazine can be coupled for common rotation in diverse ways, for instance according to one feature of the invention, mechanically by a chain drive or the like.

The proposed machine tool may also be equipped with a servo control, in which case, according to the invention, the slide and/or the guide drum is/are driven by servo means controlled by the tracer.

In another embodiment of the invention, the magazines and the guide drum are mechanically independently mounted, coupling being effected by means of an electrical, hydraulic or pneumatic transmission. The guide drum then functions principally as an element controlling the motions of the magazines.

It is also possible to copy at a larger or reduced scale if, according to yet another feature of the invention, the tracer is radially adjustable in the guide drum and the transmission means for the translatory motion of the guide drum to the magazine include a ratio which equals the ratio of the radii of the tracer and tool in relation to their axes of rotation. The reduction or enlargement in scale in the vertical due to the ratio of the two radii will thus be matched by a like reduction or enlargement in the other directions.

The invention also includes the possibility of controlling the guide drum in a conventional manner by a program, in which case all the motions of the guide drum will be transmitted to the magazine in the manner already described. Moreover, the magazine may be directly controlled by reference to a program by-passing the guide drum.

BRIEF DESCRIPTION OF THE DRAWINGS

Several embodiments of the invention are illustratively shown in the drawings and will now be described in greater detail. For the sake of simplicity, a machine is described equipped with only one magazine, but it is understood that the invention is not intended to be limited to such forms of construction. In the drawings.

DETAILED DESCRIPTION

Figure 1:
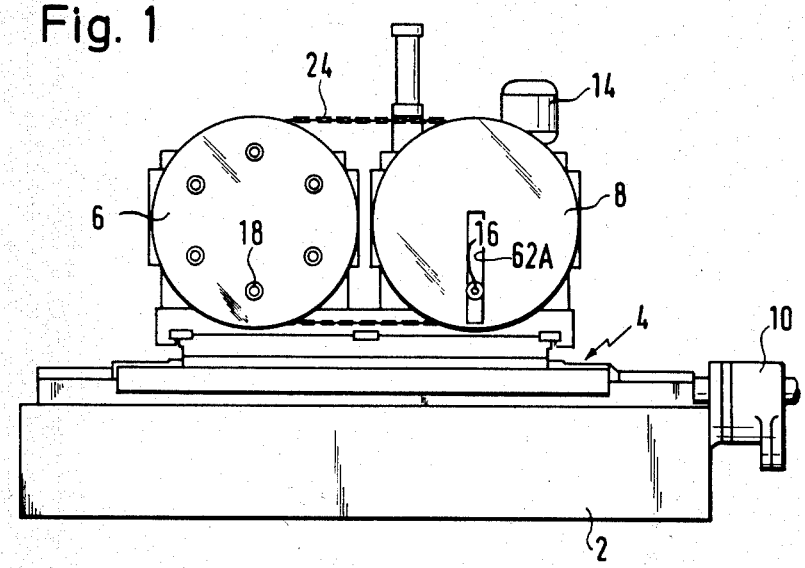
FIG. 1 is a view of a machine tool comprising a mechanically coupled rotary magazine and a guide drum.
Figure 2:
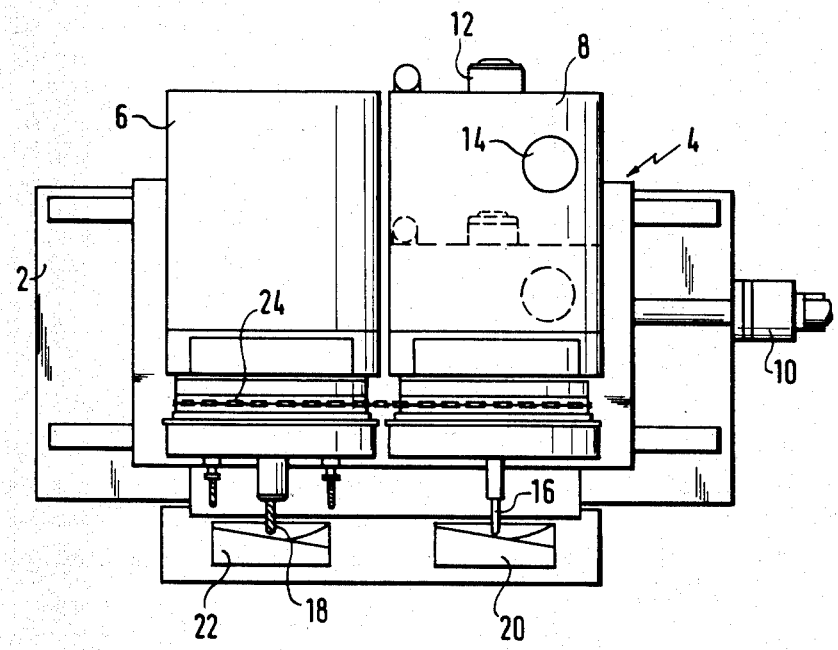
FIG. 2 is a view of the machine in FIG. 1 from above.

The machine tool illustrated in FIGS. 1 and 2 comprises a compound slide 4 which carries a rotary magazine 6 and a guide drum 8, side-by-side. A drive means 10 is provided for facilitating a movement of slide 4 along the compound slide in the longitudinal direction of the machine, whereas a drive means 12 is provided for cross traverse or movement perpendicular to the longitudinal direction.

The guide drum 8 is associated with a drive 14 for rotating the same about its axis. A tracer 16, attached to the guide drum, can therefore move in all three coordinates, vertical motion being obtained by rotation of the guide drum 8.

The rotary magazine 6 which carries the tools is firmly mounted on the compound slide 4 in the same way as the guide drum and it is thus coupled to the slide 4 for longitudinal and cross traverse in the machine. Moreover, a chain 24 couples the magazine for codirectional rotation with the guide drum 8 so that a tool 18 in the magazine 6 will exactly reproduce the motions of the tracer. The contours of a pattern 20 can thus be reproduced on the workpiece 22.

If it is now desired to substitute a finishing tool for a roughing tool, all that is required is for the chain drive 24 to be undone and the magazine 6 to be rotated into a different relative angular position to the guide drum 8. The tool which is now in the angular position corresponding to that of the tracer will be in working position.

With particular reference to FIG. 2, all the tools in the magazine are mounted in their own holders. The holder of the tool in working position is axially advanced sufficiently to ensure that the other tools in the magazine are clear of the work 22. The arrangement may be so devised that the tool holder will not be coupled to the tool drive inside the magazine until the tool holder has been correctly advanced and all the other idle tools in the magazine are disengaged.

The embodiment illustrated in FIGS. 1 and 2 contains servo motor drives for traversing the compound slide and the guide drum. These may be controlled in a conventional manner by the tracer 16 which can move in all three coordinates functioning as a control means. Naturally, direct manual control of the tracer 16 or of the guide drum 8 would be possible, but for the sake of clarity this is not shown.

Figure 3:
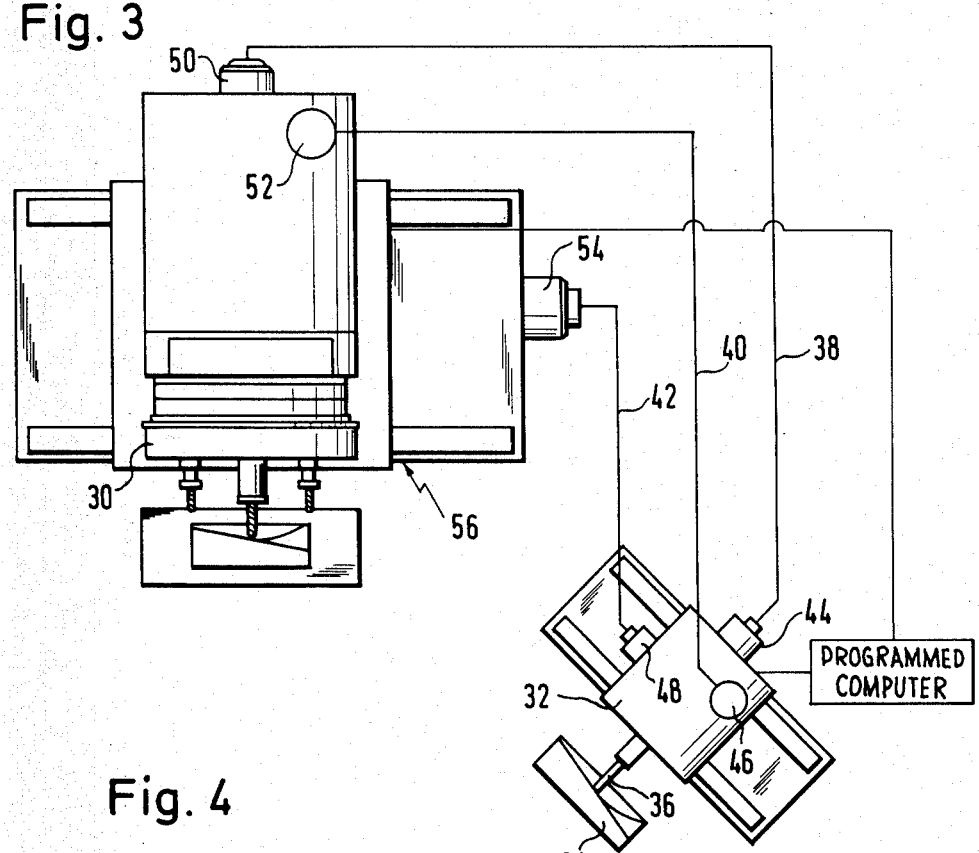
FIG. 3 is a machine tool equipped with a magazine and a guide drum coupled by electrical control means.

FIG. 3 is yet another embodiment in which the rotary magazine 30 and the guide drum 32 are mechanically independently mounted. The motions of the tracer 36 following the contours of a three-dimensional pattern 34 are transmitted to the magazine 30 by electrical, hydraulic or pneumatic transmissions 38, 40, 42 from transducers 44, 46, 48 on the guide drum 32 to servo drives 50, 52, 54 on the magazine 30. Again in this embodiment the working motions in the lengthwise and crosswise directions of the machine are generated by displacement of the magazine 30 by a compound table 56, whereas vertical motions are generated by rotary motions of the magazine.

Figure 4:
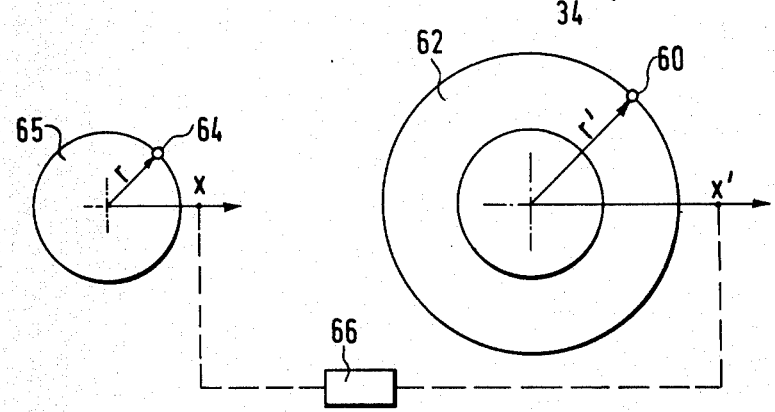
FIG. 4 is a schematic view of a magazine and guide drum provided with means for reduced or enlarged scale copying.

FIG. 4 illustrates how a machine tool, according to the invention, can be used for enlarged or reduced scale copy machining. For such a purpose the contour tracer 60 is radially adjustable in the guide drum 62 (see radial slot 62A in FIG. 1). This permits the vertical motions of the contour tracer to be transmitted to the tool 64 in the magazine subject to a ratio of $r : r'$. At the same time, translatory motions of the guide drum are changed by a control means 66 in the same ratio, so that in the example in FIG. 4 for instance, for profile milling $x' : x = r' : r$. For contour milling, the transmission of motions in the crosswise direction of the machine can be similarly subjected to a transmission ratio, although this is not shown.

The last described arrangement also permits the ratios in several coordinates to be different, as may be necessary for instance in dividing work.

The invention also embraces the possibility of controlling the guide drum, for instance, by optical reading equipment which follows the lines of a drawing, or directly by a programmed computer. Further functional amplification will be achieved if the magazine is itself directly controlled by a program independently of the guide drum so that the proposed machine tool can optionally be used either for duplicating three-dimensional patterns or masters or for work as a controlled machine tool.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A machine tool, comprising:
   base means;
   at least one tool magazine movably mounted on said base means and rotatable about a horizontal axis, said tool magazine having a plurality of separately drivable tools and tool spindles therefor disposed parallel to and spaced from the axis of said tool magazine;
   guide drum means disposed alongside said tool magazine and movably mounted on said base means and rotatable about a horizontal axis; and
   control means for controlling translatable movement of said tool magazine and said guide drum means for simultaneous movement and so that said movements of said tool magazine are the same as said guide drum means in all the directions of motion, said guide drum means including tracer means spaced from the axis of rotation thereof and rotatable therewith for tracing the profile or contour of a master or pattern.

2. A machine tool according to claim 1, wherein said base means for said tool magazine and said guide drum means comprises a base member on which a common compound slide is mounted and which is movable longitudinally with respect to said base member.

3. A machine tool according to claim 2, wherein said base means includes drive means for said compound slide to effect a simultaneous movement of said guide drum means and said tool magazine supported thereon.

4. A machine tool according to claim 1, wherein said control means further includes a chain drive connecting said tool magazine and said guide drum means together.

5. A machine tool according to claim 1, wherein said base means comprises independent base members; and
   wherein said tool magazine and said guide drum means are each mounted on one of said independent base members and traversible on slides along the lengths thereof.

6. A machine tool according to claim 5, wherein said tool magazine and said guide drum means are mechanically independently mounted on said independent base members; and
   wherein said control means comprises servo transmission means for transmitting the translatory movements between said guide drum means and said tool magazine.

7. A machine tool according to claim 6, wherein said tracer means is radially adjustably mounted in said guide drum means, said servo transmission means for transmitting the translatory movements of said guide drum means to said tool magazine includes a ratio characteristic means which equals the ratio of the radii $(r',r)$ of the positions of said tracer means and said tool in relation to their respective axes of rotation.

8. A machine tool according to claim 6, wherein said tool magazine and said guide drum means are selectively controllable by a program to control the movement of at least one of said tool magazine and said guide drum means.

9. A machine tool according to claim 8, wherein said program controls said tool magazine independent of said guide drum means.

* * * * *